Nov. 15, 1955 M. H. HAYES ET AL 2,724,108
NULL BALANCE TRANSFORMER SYSTEM
Filed Oct. 23, 1953

MONSON H. HAYES
JAMES L. WEST
INVENTORS

BY
Watson, Johnson, Leavenworth & Blair
ATTORNEYS

United States Patent Office 2,724,108
Patented Nov. 15, 1955

2,724,108

NULL BALANCE TRANSFORMER SYSTEM

Monson H. Hayes and James L. West, Binghamton, N. Y., assignors to Link Aviation, Inc., Binghamton, N. Y., a corporation of New York Application October 23, 1953, Serial No. 387,950

11 Claims. (Cl. 340—253)

This invention relates to a system for measuring a null voltage or current in any alternating current null balancing system. In the electrical arts generally, and particularly in the analogue computer, automatic control and instrumentation arts many varied measuring instruments, controls and computers utilize null-balancing circuits as an important part thereof. Null balancing measurement or control has important advantages over measurement or control by means of absolute quantities since a null may be more accurately detected. In addition, in null balancing systems great amplification may be utilized without regard to its linearity or amplification factor, since null balancing systems detect the absence or presence of a voltage or current rather than measure its magnitude. It is important however, in null balancing systems that the null points sought be as "sharp" as possible, meaning that an exact condition be available at which current or voltage may be adjusted to an absolute minimum. In addition, due to the relative insensitivity of most alternating current indicating devices, it is usually desirable to amplify the output from the null device to increase the sensitivity and speed of response of the null measuring or balancing system being used.

It is therefore an object of our invention to provide a null-balancing system in which sharper nulls may be acquired.

It is an additional object of our invention to provide a null balancing system which minimizes capacitive loading of the elements of the balancing system.

It is a further object of the invention to provide a null balancing transformer system in which capacitive currents between windings are minimized.

Other objects will appear as the description proceeds.

The invention accordingly comprises the features of circuit construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawing, in which.

Figure 1:
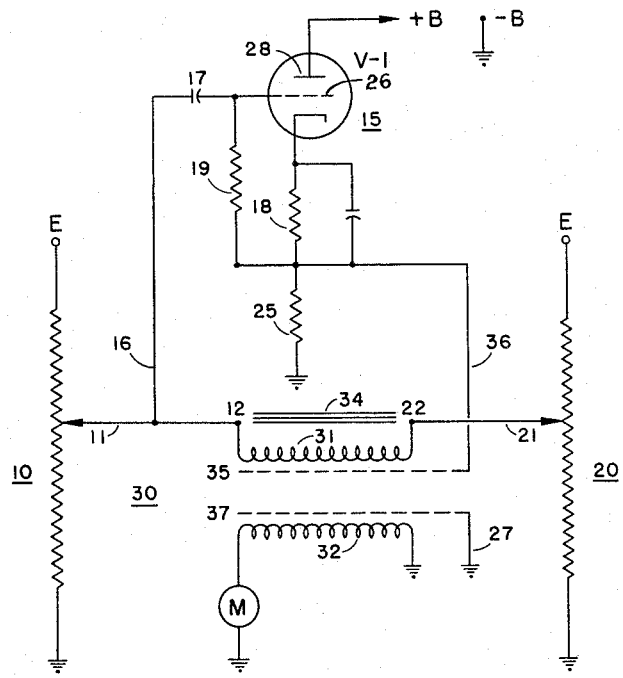
Fig. 1 is a schematic diagram of the invention as utilized for measuring a null in an ordinary bridge circuit.

Referring to Fig. 1 there are shown two identical potentiometers 10 and 20, each of which forms two legs of an ordinary bridge circuit. The upper terminals of each of the two potentiometers are connected to one terminal of a source of alternating voltage indicated as E, and the other terminal of the voltage source is connected to ground. It will be apparent that since the alternating voltage is applied across both potentiometers, that for each position of wiper arm 11 on potentiometer 10 there will be a corresponding position of wiper arm 21 of potentiometer 20, at which point the two terminals 12 and 22 of transformer 30 will swing at the same alternating electrical potential. Under such a condition, no voltage will be applied across primary winding 31 of transformer 30, and hence no voltage will be induced in secondary winding 32 from primary winding 31. However, in prior art systems not employing the subject invention, the variation in alternating potential of the primary winding 31 with respect to ground causes small capacitive currents to flow from the transformer primary winding 31 to ground. These currents cause loading of the bridge elements. The above variation also causes small capacitive currents to flow through the distributed capacity between primary winding 31 and secondary winding 32. While current flow through the distributed capacity to secondary winding 32 near the grounded end of winding 32 will flow to ground without any harmful effect, currents entering winding 32 near its opposite end will develop a potential across the impedance of the winding and will cause a current through the null-measuring device M. Hence it will be seen that although wipers 11 and 21 are at the same potential, that the device will not indicate a sharp null. While the capacitive currents referred to may be small, their presence destroys the effectiveness and accuracy of many null-balancing measurements, since an opportunity of adjusting to a complete null is defeated. In order to provide a system in which sharp nulls may be obtained, it will be appreciated that these aforementioned capacitive currents must be eliminated or minimized.

In the invention, capacitive currents from the primary winding are minimized as follows: Interposed between the primary winding 31 and the secondary winding 32 of transformer 30 is an electrostatic shield 35, preferably constructed of copper, which completely shields the primary winding 31 from all of the other elements of the transformer, with the exception of core 34. Connected to shield 35 via conductor 36 is the output voltage of a unity gain, high input impedance isolating device indicated generally as 15 in Fig. 1, and shown particularly therein as comprising a cathode follower circuit. The input to the cathode follower is taken from terminal 12 of the primary winding 31 and applied to control grid 26 of vacuum tube V–1 through conductor 16 and capacitor 17. Anode 28 of vacuum tube V–1 is connected to any source of unidirectional potential indicated as +B. It will be understood that vacuum tube V–1 is also supplied with a heater or filament (not shown), and that while we have illustrated vacuum tube V–1 as comprising a triode, that other multi-element vacuum tubes may be easily adapted to this system by those skilled in the art. It is also to be understood that other forms of high impedance electronic coupling means may be employed in lieu of vacuum tubes, as for example semi-conductor or transistor circuits may be used.

As in any conventional cathode follower circuit the output voltage taken from the cathode circuit follows the input voltage applied to the control grid in phase and magnitude. While we have denominated cathode follower circuit 15 as a "unity gain" device, it is recognized, and it will be readily realized by those skilled in the art, that actually the gain of a cathode follower circuit is always slightly less than unity. Grid bias for vacuum tube V-1 is furnished by cathode resistor 18 and grid resistor 19. In order to make the gain of the circuit as near to unity as possible, output resistance 25 is made large in comparison to the plate resistance of vacuum tube V–1. Output voltage from the cathode follower stage 15 is taken from the junction point between resistors 18 and 25, and is applied to shield 35 through conductor 36. It will therefore be apparent that the potential of shield 35 with respect to ground will be almost exactly the same alternating potential as wiper arm 11 and terminal 12 of the transformer have with respect to ground. There being no appreciable difference in potential between primary winding 31 and electrostatic shield 35, no appreciable capacitive current will flow through the distributed capacity between these elements.

A similar electrostatic shield 37 completely shields secondary winding 32 from all of the other elements of the transformer. Shield 37 is connected to ground through conductor 27. Since one terminal of secondary winding 32 is also connected to ground, shield 27 and all of secondary winding 32 lie at the same potential with respect to ground when a null is being measured, and hence no appreciable capacitive current will flow between secondary winding 32 and shield 37. The main function of shield 37 is to shield secondary winding 32 from electrostatic shield 35. Since shield 35 is swinging at a voltage above ground potential, capacitive currents will flow between shield 35 and grounded shield 37, but no appreciable capacitive currents will reach secondary winding 32. The capacitive current flow between shields does not appreciably load the bridge elements because of the high input impedance of the cathode follower circuit.

It will thusly be apparent that the only voltage appearing in secondary winding 32 will be that magnetically induced from the primary winding 31. Hence the capacitive currents which have heretofore interfered with the obtaining of a sharp null have been eliminated, and the flow of capacitive currents from primary winding 31 so as to load the bridge elements has also been eliminated.

Figure 2:
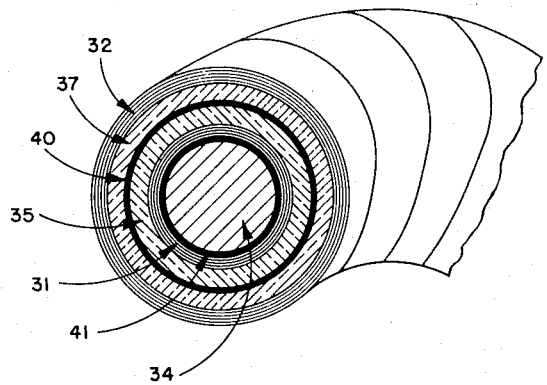
Fig. 2 is a cross section view through a transformer which may be utilized as an element of the invention.

Referring to Fig. 2 there is shown a cross section of a toroidal transformer which may be utilized as transformer 30 of our invention. In Fig. 2, like reference numerals indicate corresponding parts of the transformer shown schematically in Fig. 1. The transformer consists of a torus-shaped iron or ferromagnetic core 34 around which is wound primary winding 31. Concentrically surrounding winding 31 is a copper shield 35, preferably wound of copper strap to reduce circulating currents. In order to insure that copper shield 35 will not constitute a shorted turn, it is important that the ends and edges of the copper strap be insulated from each other. Surrounding shield 35 is insulation 40 serving to isolate shield 35 from a similar outer shield 37 which may also be constructed of copper strap, and which also should have its ends and edges insulated from each other. Concentrically wound about the outer shield 37 and insulated therefrom is secondary winding 32. A surrounding shield (not shown) may be placed about the entire transformer assembly if desired.

While we have shown our invention as applied to an ordinary potentiometer bridge, it will be understood that it may be applied to any alternating current null-measuring system, such as a servomotor control, inductance capacitance, resistance, and frequency measuring bridges, etc., and like devices. It will also be understood that while we have utilized a simple cathode follower as the unity gain, high input impedance isolating device in our system, that other isolating devices, such as a pair of feedback amplifiers in series could be used. It will also be understood that various changes and modifications in our system may be made by those skilled in the art without departing from the scope of the invention as defined by the appended claims.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

We claim:

1. In a system for determining the null of a voltage, a transformer having a primary winding and a secondary winding, said primary winding connected to said voltage, said secondary winding connected to an output device, electrostatic shield means interposed between said primary winding and said secondary winding, and high impedance unity-gain isolating means connected between said voltage and said electrostatic shield means.

2. In a system for deriving an output voltage as a function of an input voltage, a transformer having a core, a primary winding and a secondary winding, said secondary winding being connected to an output circuit, first electrostatic shield means isolating said primary winding from said secondary winding, second electrostatic shield means isolating said secondary winding from said first electrostatic shield means, said electrostatic shield means being insulated from each other, means connecting said second electrostatic shield means to said secondary winding, means connecting said input voltage to said primary winding, and high impedance unity-gain isolating means connecting said first electrostatic shield to said primary winding.

3. In a system for deriving an output voltage as a function of an input voltage, a transformer having a core, a primary winding and a secondary winding, said input voltage being connected to energize said primary winding, said secondary winding being connected to an output circuit, first electrostatic shield means to isolate said primary winding electrostatically, unity-gain isolating means connecting said input voltage to said first electrostatic shield means, second electrostatic shield means to isolate said secondary winding electrostatically, said first and said second electrostatic shield means being insulated from each other.

4. A system for deriving an output voltage as a function of an input voltage comprising a transformer having a primary winding and a secondary winding, said input voltage being connected to energize said primary winding, said secondary winding being connected to an output circuit, electrostatic shield means to isolate said secondary winding electrostatically, said shield means being electrically connected to one terminal of said output circuit, further electrostatic shield means to isolate said primary winding from said first mentioned electrostatic shield means and from said secondary winding, and high impedance electronic isolating means connected between said further electrostatic shield means and said input voltage to maintain said further electrostatic shield at a potential proportional to said input voltage.

5. A system for determining the presence of an input voltage comprising a transformer having a primary winding and a secondary winding, said input voltage being connected to energize said primary winding, said secondary winding being connected to an output circuit, first electrostatic shield means, isolating means connected to drive said first electrostatic shield means at a potential proportional to said input voltage, second electrostatic shield means interposed between said primary and secondary windings, said second electrostatic shield means being connected to said output circuit.

6. A system for providing an output voltage as a function of an input voltage comprising a transformer having a primary winding and a secondary winding, said input voltage being connected to energize said primary winding, said secondary winding being connected to an output device, first electrostatic shield means interposed between said primary winding and said secondary winding, second electrostatic shield means interposed between said secondary winding and said first electrostatic shield means, and unity-gain isolating means connecting said first electrostatic shield means to said input voltage.

7. A system for providing an output as a function of an input voltage comprising a transformer having a primary winding and a secondary winding, said input voltage being connected to energize said primary winding, said secondary winding being connected to an output device, first electrostatic shield means interposed between said primary winding and said secondary winding, second electrostatic shield means interposed between said secondary winding and said first electrostatic shield means, isolating means responsive to said input voltage and operable to drive said first electrostatic shield means at an alternating potential proportional to and in phase with said input voltage, said second electrostatic shield means being conductively connected to said output device.

8. A transformer comprising a ferromagnetic torus, a primary and a secondary winding wound about the surface of said torus, electrostatic shield means interposed between said windings, said shield means comprising a plurality of straps of non-magnetic material, one of said straps being conductively connected to said secondary winding, an isolating device connected to said primary winding to receive a voltage proportional to any voltage impressed upon said primary winding, the output of said isolating device being connected to a second of said straps to impress thereupon a voltage proportional to and in phase with the voltage applied to said primary winding.

9. A system for providing an output as a function of an input voltage comprising a transformer having a torus-shaped ferromagnetic core, primary and secondary windings wound about the surface of the torus concentrically with respect to each other, said primary winding being connected to be energized by said input voltage, said secondary winding being connected to an output device, first and second electrostatic shield means interposed between said primary winding and said secondary winding, said electrostatic shield means being insulated from each other, isolating means responsive to said input voltage and connected to one of said electrostatic shield means, said second electrostatic shield means being conductively connected to said output device.

10. In a system for determining the null of an electrical quantity, first magnetic means connected to said electrical quantity, second means disposed within the magnetic field of said first means and operative to provide an output signal proportional to said quantity, electrostatic shield means disposed between said foregoing means and high impedance potential coupling means connected between said electrical quantity and said shield means whereby said shield is continuously maintained at a potential proportional to the magnitude of said electrical quantity.

11. In a null balancing voltage measuring circuit, means effecting a sharp null balance comprising a transformer having primary and secondary windings upon a ferromagnetic core, first and second electrostatic shields between said primary and secondary windings respectively, means insulating said electrostatic shields from each other and from said windings, means connecting a potential to be measured across said primary winding, a cathode follower circuit, means connecting one side of said primary winding to the input of said cathode follower circuit, means connecting the output of said cathode follower to said first electrostatic shield, means connecting the secondary winding of said transformer to a potential indicator, and means connecting said second electrostatic shield to one side of said secondary winding.

References Cited in the file of this patent

UNITED STATES PATENTS

| | | |
|---|---|---|
| 1,320,980 | Bowman | Nov. 4, 1919 |
| 1,362,138 | Pratt | Dec. 14, 1920 |
| 1,786,412 | Crisson | Dec. 23, 1930 |
| 2,263,932 | Schnoll | Nov. 25, 1941 |
| 2,637,018 | Hertog | Apr. 28, 1953 |